United States Patent [19]

Williams

[11] Patent Number: 4,725,292
[45] Date of Patent: Feb. 16, 1988

[54] SELF-CLEANING FILTER

[75] Inventor: Roger D. Williams, Dallas, N.C.

[73] Assignee: Pneumafil Corporation, Charlotte, N.C.

[21] Appl. No.: 682,948

[22] Filed: Dec. 18, 1984

Related U.S. Application Data

[63] Continuation-in-part of Ser. No. 579,218, Feb. 10, 1984, abandoned.

[51] Int. Cl.$^4$ .............................................. B01D 46/04
[52] U.S. Cl. ......................................... 55/96; 55/290; 55/294
[58] Field of Search ...................... 55/96, 97, 283, 290, 55/294; 210/413; 15/312 R

[56] References Cited

U.S. PATENT DOCUMENTS

| | | |
|---|---|---|
| 2,594,957 | 4/1952 | Martens . |
| 2,634,560 | 4/1953 | Ramm .............................. 15/312 R |
| 3,147,098 | 9/1964 | Honan et al. . |
| 3,306,012 | 2/1967 | Wallin . |
| 3,339,348 | 9/1967 | Bratton et al. .......................... 55/294 |
| 3,345,805 | 10/1967 | Sherrill . |
| 3,505,792 | 4/1970 | Dahlem . |
| 4,203,738 | 5/1980 | Kerman . |

FOREIGN PATENT DOCUMENTS

1017890 10/1957 Fed. Rep. of Germany .
1009993 of 1905 United Kingdom .

Primary Examiner—Bernard Nozick
Attorney, Agent, or Firm—Shefte, Pinckney & Sawyer

[57] ABSTRACT

A self-cleaning apparatus comprising a rotary drum filter which collects foreign matter on one surface of the filter media thereof, and a cleaning apparatus that includes an endless belt having openings formed therein and arranged for axial movement along the surface of the filter media, the belt being mounted for such movement on a plenum chamber having an extending slot which communicates with the openings in the belt during such movement thereof whereby a vacuum imposed within the plenum chamber will act to remove foreign matter from the filter media surface. The belt includes retaining means which permit a variety of nozzle elements or imperforate plates to be mounted on the belt at its openings. The filter may be a rotary drum filter which rotates past the moving belt, or may be a bank of stationary flat filter elements with the moving belt being mounted on a carriage for additional movement within a spacing between each two adjacent filter elements with a control system being provided for automatically and continuously operating the cleaning belt so that is moves within the spacing of each two adjacent filter elements in a predetermined sequences so as to clean all of the filter elements in the bank.

35 Claims, 15 Drawing Figures

SELF-CLEANING FILTER

RELATIONSHIP TO OTHER APPLICATIONS

This is a continuation-in-part application of U.S. patent application Ser. No. 579,218, filed Feb. 10, 1984, now abandoned.

BACKGROUND OF THE INVENTION

The present invention relates generally to filtering apparatus in which air or other fluids having foreign matter such as dust entrained therein is caused to flow through a filter media to deposit such foreign matter on one surface of the filter media, and a cleaning system is provided for automatically removing the foreign matter collected on the filter media surface.

A typical filtering apparatus of the foregoing type is a rotary drum filter which includes a rotating support structure on which the filter media is supported so that it assumes a generally cylindrical shape. A flow of dirty fluid, such as air, passes through the filter media from the outside surface thereof to the inside of the drum, with the dirt, dust or other foreign matter being deposited on the exterior surface of the filter media and with the cleaned air being withdrawn from the interior of the drum. It will be apparent that during use, the filtered foreign matter will build up on the exterior surface of the filter media, and it must be periodically removed to prevent the filter media from blinding.

One known arrangement for cleaning the exterior surface of the rotary drum filter includes a row of adjacent fixed suction nozzles that extend axially along the exterior surface of the drum closely adjacent to the exterior surface thereof, so that as the drum is rotated past the fixed cleaning nozzles, the suction that is constantly imposed on the suction nozzles will remove foreign matter from the filter media surface. In general, however, cleaning arrangements of this type require more suction than other types of cleaning arrangements so that operating costs are relatively high, and it is usually more difficult to control properly the desired suction to be imposed through the nozzle.

Another known arrangement for cleaning rotary drum filters of the abovedescribed type includes a structure for mechanically moving a plurality of suction nozzles back and forth in an axial direction across the exterior surface of the rotating drum filter. This arrangement usually includes a fixed track extending axially along the exterior surface of the rotary drum filter, one or more carriage members having wheels which engage the fixed track, and a chain drive for causing reciprocal movement of the carriage member along the track. The carriage members have suction nozzles mounted therein for removing foreign matter from the drum filter during such reciprocating movement, and the nozzles each have relatively long and flexible suction conduits attached thereto that will accommodate the range of movement of the carriage members from one end of the track to the other. This type of cleaning arrangement has certain drawbacks, including a relatively high cost, and a relatively large number of moving parts which are usually operating in an environment of high dust content that can adversely affect the reliability and proper operation of these moving parts. Additionally, the effectiveness of the cleaning operation itself is reduced because of the back-and-fourth or reciprocating movement of the nozzles which results in the nozzles being moved over portions of the filter element which have just been cleaned when the carriage members change direction at the ends of the track, whereby the dirtiest part of the filter element at the other end of the filter is not cleaned until the carriage has traversed the entire length of the track.

In another typically known filtering apparatus, a plurality of large, generally flat filter elements are arranged in an upright position to present generally vertically disposed filtering surfaces, the filter elements being disposed in spaced relation with the filtering surfaces of adjacent filter elements facing one another so that large volumes of air can be drawn between the filter elements and through the facing filtering surfaces thereof by any convenient suction source, such as a suction blower connected to the interiors of the filter elements, whereby foreign matter in the air is separated from the air and collected on the exposed, facing filtering surfaces of the filter elements. To conserve space, these filter elements are usually located with only a small spacing therebetween, and because of this close proximity, and the size of the filter elements, it has not been heretofore possible to provide a commercially acceptable automatic cleaning system for the filter elements, and cleaning is therefore generally done manually, using a broomlike device to periodically wipe the collected foreign matter from the filtering surfaces of the filter elements. This manual cleaning is both time consuming and expensive from the standpoint of the labor required, and can result in the filter elements not being cleaned at proper intervals because the required labor is not available.

In accordance with the present invention, a filter cleaning arrangement is provided which overcomes the above-described drawbacks of conventional filter cleaning devices, and which offers a number of additional advantages not available in such conventional devices.

SUMMARY OF THE INVENTION

The present invention provides a self-cleaning filter arrangement in which the filter media is supported to provide a surface for filtering fluid, such as air, therethrough and for collecting the foreign matter entrained in such fluid on such surface, and in which a belt element with openings therein is moved across the aforesaid filter surface to remove foreign matters therefrom. The belt element is arranged for movement across the filter surface, with the openings in the belt member being located at spaced positions along the belt, and a vacuum is imposed at such openings to draw foreign matter therethrough.

In one embodiment of the present invention, the filter element is a rotary drum that supports the filter media in a cylindrical configuration, and that is rotated about its axis and past the cleaning apparatus. The belt is an endless belt having the aforesaid openings therein, and it is mounted for movement across the rotating cylindrical filter surface in a direction parallel to the axis thereof. The endless belt is carried on two rollers, one of which is selectively driven, located at the extending ends of a fixed plenum chamber that is substantially closed and that is formed with a slot extending along the length thereof adjacent to the filter media. The belt member moves along the plenum chamber with the openings in the belt being in communication with the slot, and a vacuum is imposed at the interior of the plenum chamber, whereby dirt and other foreign matter are removed from the filter surface, through the belt openings, and into the plenum chamber to be discharged therefrom.

The belt member may be provided with retaining means at the openings for selectively mounting nozzle elements on the belt at one or more of the openings, such nozzle elements extending toward the filter media. A plurality of nozzle elements may be used, some of which have different extending lengths, so that the foreign matter on the filter media can be removed therefrom in stages. The retaining means provided on the belt can also be used to support imperforate plates that will close off openings in the belt when desired.

The rollers described above for supporting the endless belt are disposed in spaced relation to the end walls of the plenum chamber in such a manner that when the openings in the belt member move over such end walls, the suction imposed through the openings will serve to clean the rollers and the area surrounding them to thereby prevent any undesirable build up of dust or other foreign matter at the rollers.

In another embodiment of the present invention, the filter element is flat and is arranged in a stationary, upright position. An endless belt of the type described above is arranged for movement along the flat filtering surface of the filter media, with the suction source removing the foreign matter therefrom through the belt opening as described above. In this embodiment, since the filter element is stationary, a second drive means or carriage is provided for moving the belt along the filtering surface in addition to the movement of the belt about its rollers. The movement of the belt about its rollers is in one direction (e.g. lengthwise or vertical) with respect to the filter element, and the movement of the belt caused by the second drive means is in a direction different from the first direction (e.g. widthwise or horizontal).

In this embodiment, it is preferred that a plurality of the flat filter elements be provided and arranged in spaced parallel relation to one another. The endless belt is arranged between two adjacent filter elements with opposite reaches of the endless belt being disposed, respectively, in close proximity to the facing filtering surfaces of both filter elements for cleaning contact therewith, and the endless belt is moved simultaneously in a first direction along the lengthwise extent thereof and in a second direction perpendicular to the first direction of movement. In the disclosed embodiment of the invention, the endless belt is arranged with its reaches extending vertically so that driving of one of the supporting rollers for the belt will cause vertical movement thereof, and a carriage is provided for supporting the endless belt and its supporting rollers, the carriage being arranged for movement horizontally back and forth between two adjacent filter elements. In accordance with a further feature of this embodiment of the present invention, a traverse indexing device may be provided for selectively locating the carriage so that it can be moved along the spacing between any adjacent pair of the plurality of filter means, and a control system may be provided for automatically causing the belt to be moved between a predetermined pair of filter elements and then indexed to move between a different pair of filter elements, all in a predetermined sequence so that all of the filter elements can be periodically and serially cleaned.

DESCRIPTION OF THE PREFERRED EMBODIMENT

Looking now in greater detail at the accompanying drawings, FIGS. 1-8 illustrate diagrammatically one embodiment of the self-cleaning filter of the present invention which includes a wall or bulkhead 10, a support frame 12 spaced therefrom, and a rotary drum filter 14 supported therebetween on a shaft 16 having a drive motor 18 associated therewith to rotate the drum filter about its axis. The rotary drum filter 14 includes a support structure 20 about which a suitable filter media 22 is supported so that it assumes a cylindrical configuration, and presents an exterior surface on which dust, dirt and foreign matter can be collected. In normal operation, a vacuum is imposed at the circular opening 24 in the wall 10 by any convenient vacuum source (not shown), and fluid such as air is thereby drawn inwardly through the filter media 22, with the aforesaid foreign matter entrained in the air being deposited on the exterior surface of the filter media and with the cleaned fluid being drawn away through the opening 24, all in a manner well known in the trade.

Figure 1:
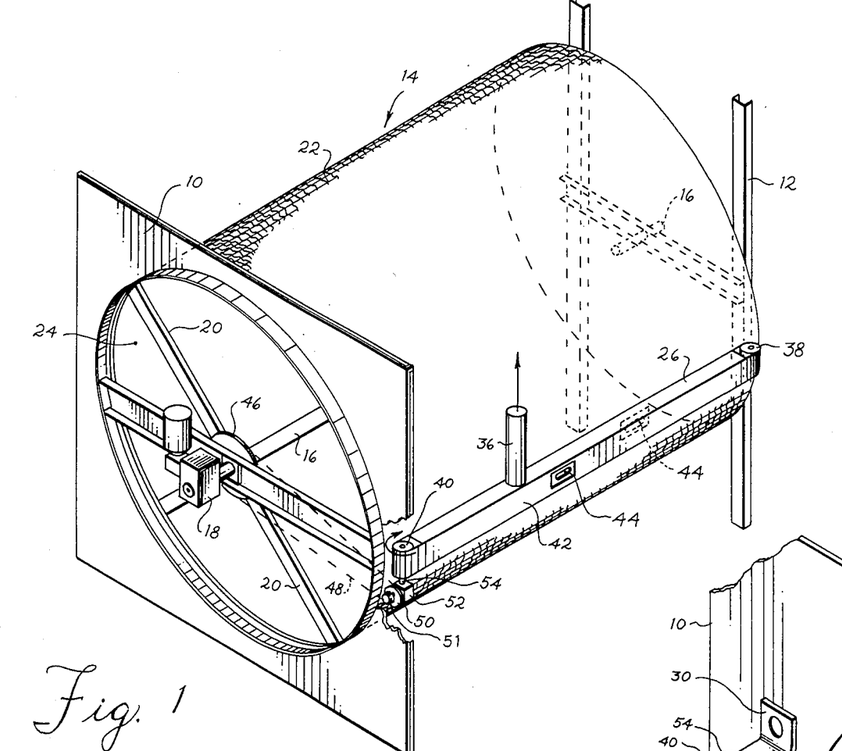
FIG. 1 is a perspective view, in generally diagrammatic form, of one embodiment of a self-cleaning filter embodying the present invention.
Figure 2:
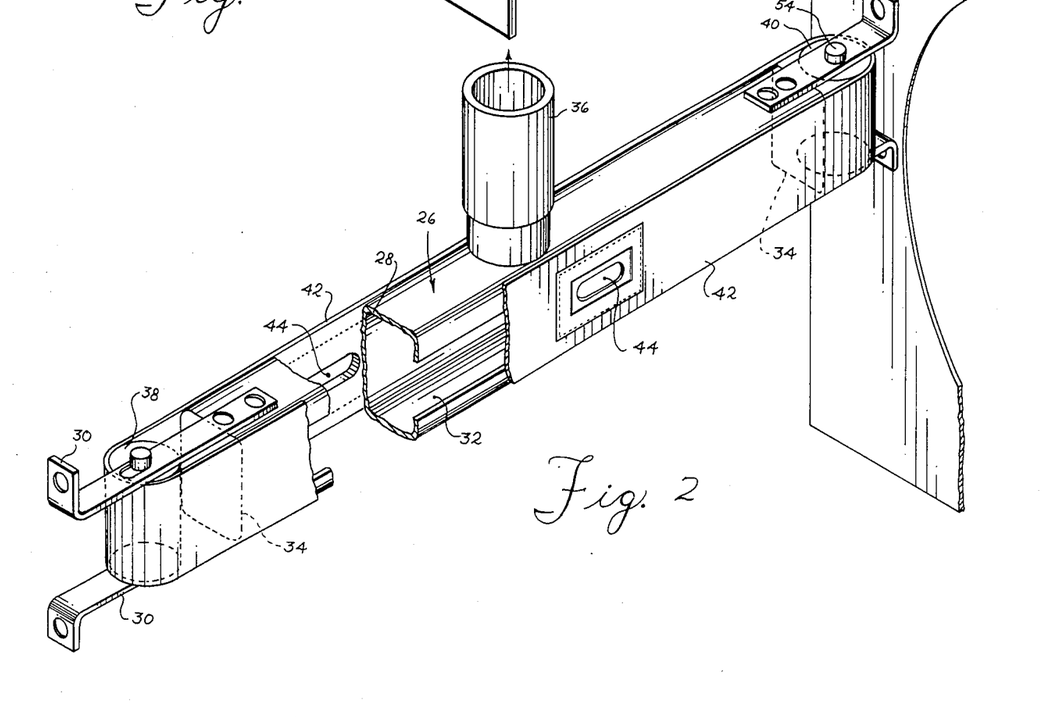
FIG. 2 is a detailed view, partly broken away, of the cleaning arrangement for the filter shown in FIG. 1.

In accordance with the present invention, a unique arrangement is provided for removing the foreign matter deposited on the fluid inlet surface of the filter media 22. As best seen in FIGS. 1 and 2, this cleaning arrangement includes a fixed generally enclosed plenum chamber 26, preferably in the form of a rectangular housing 28 that is supported by mounting brackets 30 at each end thereof which can be connected to the wall 10 and support frame 12, respectively, in any convenient manner. The housing 28 extends along the exterior surface of the filter media 22 in close proximity thereto, and a slot 32 is formed in the side wall of the housing 28 nearest the filter media 22. The ends of the housing are closed by end walls 34, and a suction inlet pipe 36 is connected through the top wall of the housing so that a vacuum may be imposed at the interior of the housing through the pipe 36 which is connected to any convenient vacuum source (not shown). Rollers 38,40 are mounted for rotation in the brackets 30 just beyond the end walls 34, respectively, and an endless belt 42 is mounted about the rollers 38,40 with one reach of the belt 42 extending along the side wall of the housing 28 having the slot 32 formed therein and with the other reach of the belt 42 extending along the opposite closed wall of the housing 28 as best seen in FIG. 2. The belt 42 is formed with at least one opening 44 extending therethrough, and preferably two or more openings 44 spaced from one another along the extending length of the belt 42. In the embodiment of the invention illustrated in FIGS. 1 and 2, two openings 44 are provided, and they are spaced at equal distances from one another so that one of the openings 44 is essentially always adjacent the filter media 22 during movement of the belt 42.

Figure 8:
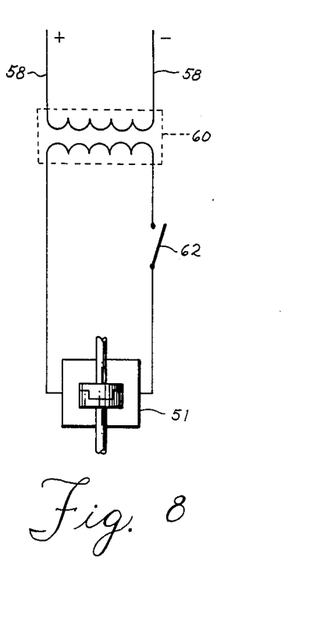
FIG. 8 is a wiring diagram illustrating the electrical circuit for controlling the movement of the belt in the embodiment of the invention shown in FIG. 1.

This movement of the belt 42 is preferably obtained by mounting a drive sprocket 46 on the shaft 16 of the rotary drum filter 14, and providing a chain 48 that extends from the drive sprocket 46 to a driven sprocket 50 operatively associated with an electrically operated clutch 51 connected to a gear reduction unit 52 which is connected to the shaft 54 of the roller 40. In the preferred embodiment of the present invention, the belt 42 is moved across the filter media 22 to clean it when a certain quantity of foreign matter has accumulated on the exterior surfaces of the filter media 22. More specifically, as the foreign matter builds up on the filter media 22, the ability of the air to flow therethrough is impaired, causing a gradually increasing pressure drop across the filter media 22. An electrical control circuit, as shown in FIG. 8, is provided for moving the belt 42 when the pressure drop across the filter media 22 reaches a predetermined maximum (e.g. 2" water), such circuit including inlet electrical supply lines 58, an a.c./d.c. transformer 60, the electrical clutch 51 described above, and a conventional pressure sensitive electrical switch 62 which will close the circuit when it senses that the pressure drop across the filter media 22 has reached the aforesaid predetermined maximum amount, whereupon the electrical clutch 51 is energized to cause rotation of the shaft 54 of the roller 40 and cause movement of the belt 42 until the filter media 22 has been cleaned sufficiently to cause the pressure drop to reach a predetermined minimum, at which point switch 62 opens to stop further movement of the belt 42. If desired, the electric clutch 51 could be eliminated so that the roller 40 is constantly driven by the rotation of the rotary drum filter 14, and suction through the inlet pipe 36 is controlled to be imposed only when the filler becomes sufficiently dirty to require cleaning.

In operation, the rotary drum filter 14 is continuously rotated about its shaft 16 by drive motor 18, and dirty air of other fluid passes through the filter media 22, depositing foreign matter on the exterior surface thereof. When this foreign matter accumulates sufficiently to cause the pressure drop across the filter media 22 to reach a predetermined maximum, the electrical clutch 51 is energized to cause movement of the belt 42. One reach of the belt 42 will move across, and closely adjacent to, the exterior surface of the filter media 22, with the opening 44 in such reach being in constant, open communication with the interior of the rectangular housing 28 through the slot 32 so that the vacuum within the housing 28 creates a suction through the opening 44 to remove the foreign matter from the filter media 22. This vacuum will also act to draw the overlapping portion of the belt 42 against the wall portion defining the slot 32 to seal the belt 42 thereagainst, and in some cases, the vacuum will draw the filter media 22 to the belt 42 to improve the cleaning capability of the belt 42. The rotation of the rotary drum filter 14, and the axial movement of the belt 42 along the surface thereof will result in the openings 44 moving across the entire surface of the filter media 22 to remove the foreign matter therefrom. Since, preferably, at least two openings 44 are used at equal spacings from one another along the length of the belt 42, one of the openings 44 will essentially always be in contact with the filter media 22 for cleaning. Also, since the belt 42 is moved in one direction only, it will be noted that when one opening 44 completes its passage across the filter media 22 at one end, the other opening 44 is just coming into cleaning contact with the filter media. Thus, as each opening 44 begins its travel across the filter media 22, it will be applied to the dirtiest end of the filter media 22. This is to be contrasted with the conventional reciprocating carriage and nozzle arrangement described above where a cleaning nozzle reaches one end of the filter media and reverses direction so that it immediately goes back over that portion of the filter media which it has just cleaned, and the other, dirtier end of the filter media is not cleaned until the nozzle has traversed the entire width of the filter media.

Figures 3, 4:
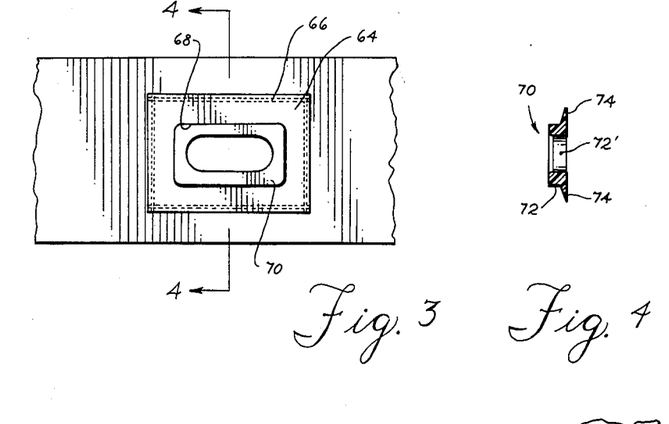
FIG. 3 is a detailed view of the belt showing a retaining member located about the belt openings.
FIG. 4 is a sectional view of a nozzle element capable of being supported on the belt by its retaining member.
Figure 7:
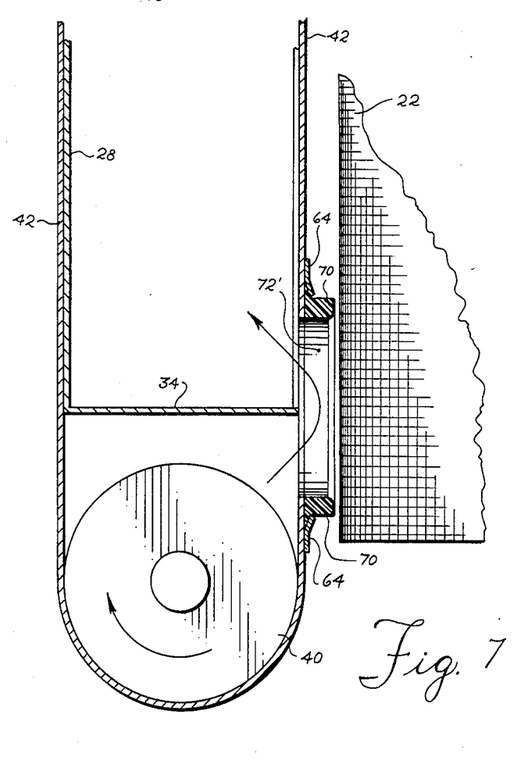
FIG. 7 is a detailed view illustrating diagrammatically the position of the belt opening during cleaning of the roller element on which the belt is mounted.

In many applications of the present invention, proper cleaning of the filter media 22 is obtained by providing the belt 42 with one or more openings 44 therein, but in other applications, it may be desirable to provide nozzle elements at the openings 44 to obtain more effective cleaning. In accordance with one feature of the present invention, the same belt may be used in both types of applications, and other possible variations for the adjusting the openings 44 can be accomplished with little or no difficulty. As best seen in FIG. 3, the belt 42 may be provided with a retaining member 64 disposed about one or more of the openings 44, this retaining member 64 preferably being in the form of a piece of fabric shaped as a frame with exterior edges thereof being secured to the belt 42 by sewn stitches 66, and with the interior edges 68 disposed about the opening 44 so that the retaining member 64 overlaps the belt 42 to form a pocket therebetween. As illustrated in FIGS. 4 and 7, nozzle elements 70 may be provided which have an outwardly extending portion 72 formed with an opening 72′ corresponding to the dimensions of the belt openings 44, and which have flared edge portions 74 dimensioned to be received within the confines of pocket formed by the retaining member 64. Thus, when it is desired to use nozzle elements 70, they can be simply inserted in such pocket with the flared edge portions 74 retained therein, with the nozzle openings 72′ disposed in communication with the belt openings 44, and with the portions 74 extending outwardly from the belt surface and toward the filter media as illustrated in FIG. 7.

Figure 6:
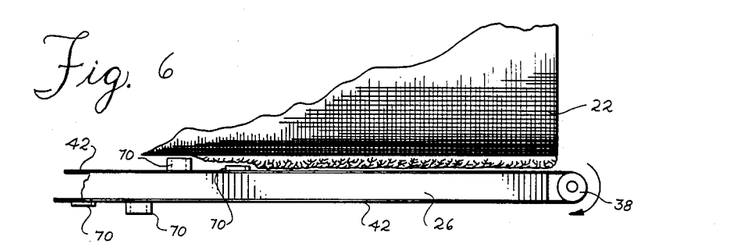
FIG. 6 is a detailed view illustrating diagrammatically the belt having mounted thereon nozzles of different extending lengths.

It will be appreciated that nozzle elements 70 may be provided which have extending portions 72 of varying lengths so that different nozzle elements 70 may be selectively mounted on the belt 42 by the retaining member 64, depending upon the application of the self-cleaning filter and the type and quantity of foreign matter being filtered. Also, as illustrated in FIG. 6, the belt 42 may be provided with two openings that are located relatively close to one another, and a nozzle element 70 having a relatively short extending portion 72 may be mounted at the leading opening, taken in the direction of movement of the belt 42, with another nozzle element 70 having a somewhat longer extending portion 72 being mounted at the trailing opening. This arrangement is particularly useful in applications having high dust loads because the dust on the filter can be removed in stages, with the first or leading nozzle element 70 removing the outermost portion of the relatively thick layer of dust and with the trailing nozzle element 70 removing the remaining dust as illustrated in FIG. 6.

Figure 5:
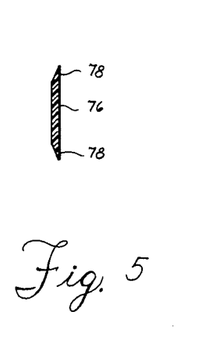
FIG. 5 is a sectional view of an imperforate plate member that is also capable of being supported on the belt by its retaining member.

The retaining member 64 may also be utilized selectively to block off or close one or more openings in the belt 42 by mounting therein a rectangular imperforate plate element 76 as illustrated in FIG. 5. This plate element 76 has tapered edge portions 78 that can readily be inserted within the confines of the pocket formed by this retaining member 64 so that the adjacent belt opening 44 is covered, and thereby closed, by the plate element 76. The plate element 76 and the above-described nozzle elements 70 are made from a suitable material, such as polyurethane, having sufficient flexibility to permit these elements to make the passage about the surface of the rollers 38,40 during movement of the belt 42 therearound.

In accordance with another feature of the present invention, the rollers 38 and 40 are closely spaced from the end walls 34 of the rectangular housing 28 so that, as illustrated in FIG. 7, when one of the belt openings 44 travels past an end wall 34 it will create a by-pass channel through such opening 44 that permits the vacuum imposed within the housing 28 to draw air from the area surrounding the roller to thereby clean such area and the roller itself by withdrawing accumulated dust or other foreign matter therefrom.

Thus, it will be noted that the self-cleaning filtering apparatus illustrated in FIGS. 1-8 is relatively simple and inexpensive in construction and operation, and it provides proper cleaning of the filter media 22 through the constant movement of the belt 42 in one direction along the surface of the filter media 22. Moreover, the self-cleaning filtering apparatus is extremely flexible in terms of its use in a wide range of filtering applications by virtue of the ease and simplicity by which varying types of nozzle elements 70 can be quickly mounted and removed from the retaining members 64, and by virtue of the fact that the belt 42 can be formed, if desired, with a large number of openings 44 which can be selectively used with different nozzle elements 70 or closed by the plate elements 76.

Figure 9:
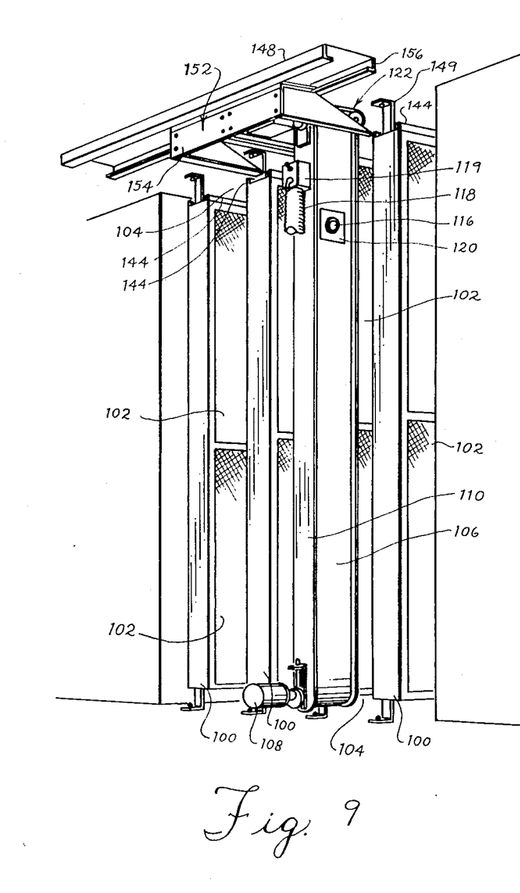
FIG. 9 is a perspective view, in generally diagrammatic form, of a second embodiment of the present invention in which generally flat filters are cleaned.

A second embodiment of the present invention is illustrated in FIGS. 9-15, and is used primarily for cleaning flat stationary filters. FIG. 9 illustrates a plurality of such generally flat filter elements 100 arranged in an upright or vertical disposition, and in spaced, parallel relation to one another so that the exposed surfaces 102 thereof face one another. Air or other fluid to be filtered is drawn through filtering surfaces 102 by a conventional suction blower (not shown) connected to the interior of each of the filter elements 100 whereby large quantities of air is pulled from the surrounding area, and drawn into the spacings 104 between the respective filter elements 100 and through the facing, exposed filtering surfaces 102 thereof so that foreign matter in the air is removed therefrom and collected on the filtering surface 102. This arrangement of the filter elements 100 is conventional, and it will be understood that although four filter elements are shown in FIG. 9, any desired number of filter elements 104 could be used in the filter bank. For example, in filter installations used to clean the air in large areas, such as may be found in textile mills and the like, it is not uncommon to use a bank of ten filter elements 100.

Figures 10, 12, 13:
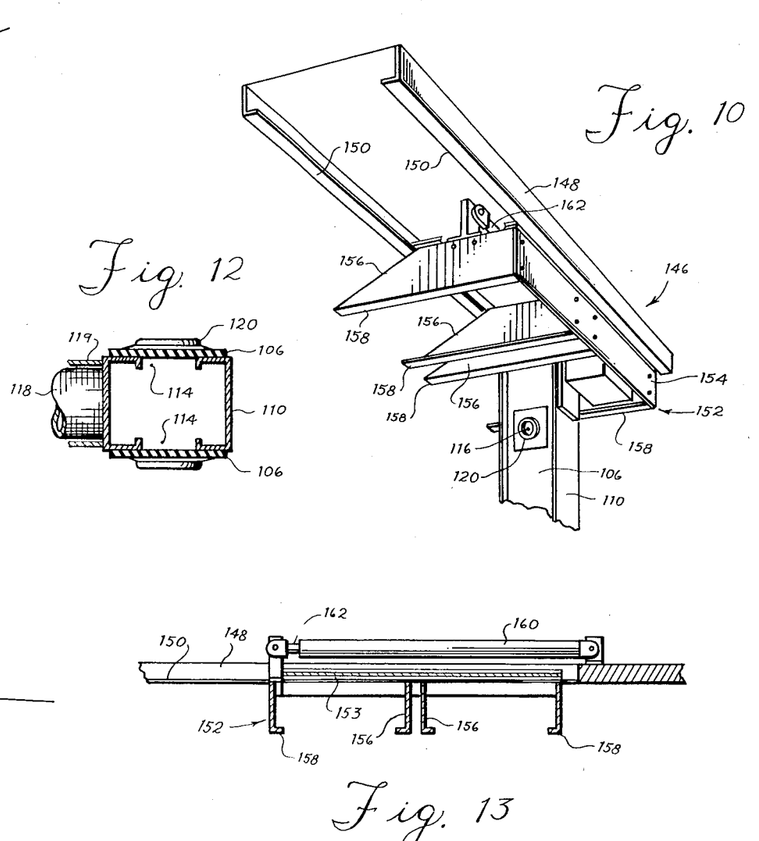
FIG. 10 is a detailed perspective view of the transverse indexing device shown in FIG. 9.
FIG. 12 is a detailed cross-sectional view illustrating the belt and the plenum thereof as shown in FIG. 9.
FIG. 13 is a detailed view showing the operating motor for the transverse indexing device shown in FIG. 10.
Figure 11:
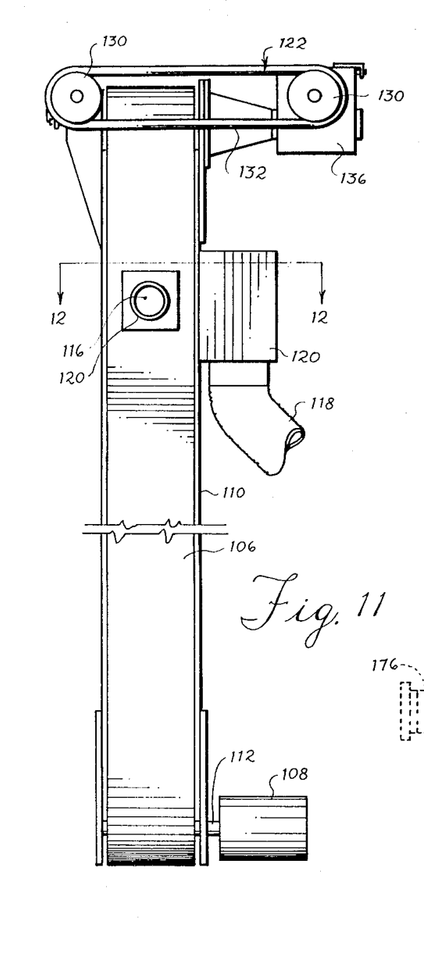
FIG. 11 is a side elevational view of the cleaning belt arrangement shown in FIG. 9.
Figure 14:
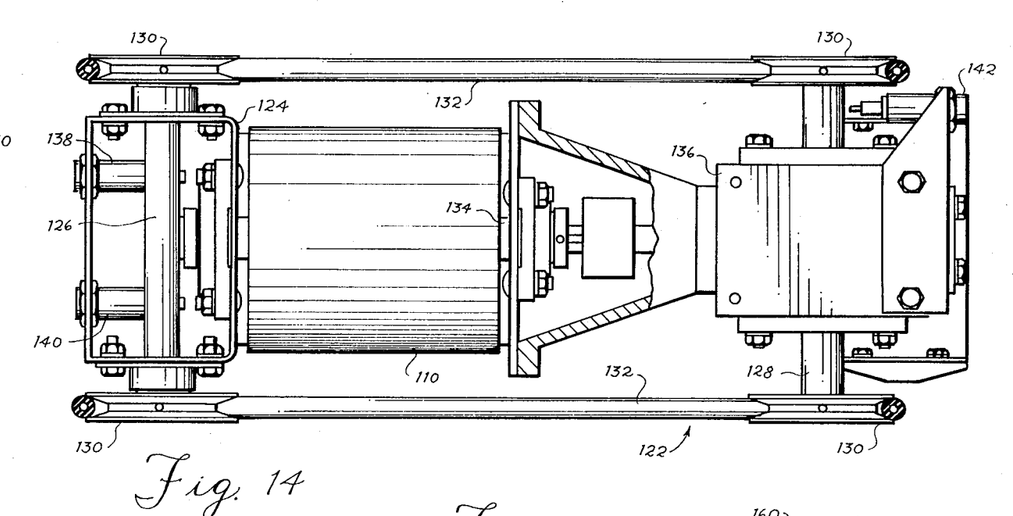
FIG. 14 is a plan view of the belt carriage device shown in FIG. 9.

As discussed above, the most common practice for cleaning filter elements of the type shown in FIG. 9 is manual cleaning, using a broom-like device or the like, but the present invention provides a unique arrangement for automatically and continuously cleaning such filter elements. As best seen in FIGS. 9 and 11, an endless belt 106 is arranged in a vertical disposition and is supported at its upper and lower ends by rollers in the same manner as that described above in connection with the embodiment of FIGS. 1-9, and a drive motor 108 is mounted on the beltsupport housing 110 to drive the lower roller through a drive shaft 112 which causes movement of the belt 106 in a vertical direction along the housing 110. As best seen in FIG. 12, the two vertically extending reaches of the belt 106 are disposed on opposite sides of the housing 110 which serves as a plenum chamber, the belt-support housing 110 including continuous slots 114 extending along the vertical extent thereof to communicate with the opening or openings 116 formed in the belt 106, and a length of flexible tubing 118 is connected at one end to the side wall of the housing through a connection box 119 and at its other end to any convenient source of vacuum (not shown) whereby a vacuum is imposed within the plenum chamber formed by housing 110 to draw air through the openings 116 in the belt 106 in the manner described above. The openings 116 in the belt 106 may, if desired, be provided with selectively removable nozzles 120 of the type shown in FIGS. 3, 4, 6 and 7.

The upper end of the housing 110 is supported in a carriage 122 so that the housing 110 and the belt 106 depend vertically therefrom, the carriage 122 including a frame 124 and a pair of spaced axles 126,128 each of which is connected at its respective ends to sheaves 130 for rotation therewith. An endless traction member 132 is disposed about each pair of aligned sheaves 130. The carriage 122 also includes a shaft 134 that extends from the upper belt roller in the belt-support housing 110 and that is connected to a conventional right angle reducer unit 136 which is arranged to drive the shaft 128 for transporting the carriage 122 in a manner to be described presently. One end of the carriage 122 has a pair of conventional proximity sensors 138,140 mounted thereon, and a third proximity sensor 142 is mounted at the other end of the carriage 122 for controlling the movement thereof, as will be explained in greater detail below.

The carriage 122 is arranged to move along pairs of tracks 144 which are located at the upper ends of the filter elements 100 and on which the traction members 132 of the carriage 122 can be disposed, it being noted that one pair of tracks 144 is provided adjacent each spacing 104 between the filter elements 100 so that the carriage 122 can be moved along the spacing 104 between any two adjacent filter elments 100. A traverse indexing unit 146, which is best illustrated in FIGS. 10 and 13, is provided for selectively and automatically locating the carriage 122 for movement along any pair of tracks 144 associated with each spacing 104 between the filter elements. This traverse indexing unit 146 includes a stationary frame 148 located along the vertical edges of one end of the filter elements 100 and spaced outwardly therefrom, the frame 148 including a pair of inwardly turned flanges 150 extending along the length thereof. A shifting unit 152 is carried in the frame 148 by a slide 153 for movement along the flanges 150 thereof, and includes a metal end wall 154 and a plurality of vertical side walls 156, each of which includes an inwardly turned flange 158 arranged in respective pairs with the spacing therebetween corresponding to the spacing between each pair of tracks 144 located above each adjacent pair of filter elements 100, movement of the shifting unit 152 back and forth along the flanges 150 is caused by a double-acting pneumatic motor 160 having a piston rod 162 connected directly to the shifting unit 152.

The operation of the embodiment illustrated in FIGS. 9–15 will now be described in conjunction with the control circuit diagrammatically illustrated in FIG. 15. Air having foreign particles therein is drawn into the filter elements 100 through the exposed filtering surfaces 102 thereof, with the foreign matter collecting on filtering surfaces 102. Assuming that the carriage 122 is located in transverse indexing unit 146 at the position shown in FIG. 9, the belt 106 is being moved along its housing 110 in a vertical direction by the drive motor 108, and the carriage 122 is moved inwardly along the spacing between the two adjacent filter elements 100 in front of the transverse indexing unit 146, such movement being the result of rotation of the sheaves 130 connected to the axle 128 which is driven through the right angle reducer 136 and the corresponding movement of the traction members 132 which move the carriage 122 from the flanges 158 of the shifting unit 152 to the immediately adjacent and aligned pair of tracks 144 above the filter elements 100. The movement of the carriage 122 along the tracks 144 causes the belt housing 110 and the belt 106 to be moved in a horizontal direction of movement along the spacing 104 between an adjacent pair of filter elements 100, and the relationship between the dimensions of belt housing 110 and the spacing 104 is such that the two vertical reaches of the belt 106 are disposed, respectively, in close proximity to the facing filtering surfaces 102 of the filter elements 100. Simultaneously, the belt 106 is moved along the belt housing 110 in a vertical direction of movement so that the openings 116 in the belt 106 are moved along the filtering surfaces 102 to withdraw foreign matter therefrom in the same manner as that described above in conjunction with the first embodiment of the invention, It will be noted that both of the vertical reaches of the belt 106 are moving along the facing filter surfaces 102 of two adjacent filter elements 100 so that both are being cleaned simultaneously.

Movement of the carriage 122 toward the rearward vertical edges of the filter elements 100 continues until the two proximity sensors 138,140 on the carriage 122 each generates a signal as the carriage 122 approaches a metal rear wall 164 (see FIG. 15) located at the back end of the filter elements 100. As shown in FIG. 15, the signal from sensor 138 is transmitted to a latching relay 166 which, in turn, transmits a signal to a four-way solenoid-operated valve unit 168 that controls a flow of compressor air indicated by the arrow 170 to the pneumatic motor 160 that operates the shifting unit 152. The solenoid-operated valve unit 168 is such that each time it receives a signal from the relay 166 it will reverse the flow of compressed air to the pneumatic motor 160 so that the piston 162 thereof will be moved along the entire length of the pneumatic motor 160, the extent of this movement to be predetermined so that the piston 162 will move the shifting unit 152 by a distance that will change its position so that the inturned flanges 158 thereof will be disposed immediately in front of the next adjacent pair of filter element tracks 144. Thus, in the position of the apparatus shown in FIG. 9, the signal generated by sensor 138 will cause the shifting unit 152 to be moved one step to the right so that the right-hand pair of flanges of the shifting unit 152 would be aligned with the tracks 144 on the two right-hand filter elements 100.

Simultaneously, with the signal being generated by the sensor 138, another signal is also generated by sensor 140 when it approaches the rear wall 164, and this signal is transmitted to a forward-reverse motor controller 172 which automatically reverses the direction of the drive motor 108 for the belt 106 and the carriage 122 through the right-angle reducer 136 as described above. Thus, the carriage 122 now moves back along the spacing 104 to continue cleaning the facing filtering surfaces 102 on each side thereof until the carriage 122 moves into the shifting unit 152, whereupon the proximity sensor 142 approaches the end wall 154 and generates a signal that is transmitted to the relay 166 which, as described above, operates the solenoid valve 168 to cause the pneumatic motor 160 to move the piston 162 and the shifting unit 152 one step to the left in FIG. 9, the shifting unit 152 carrying with it the carriage 122 which is now fully located within the shifting unit. The signal generated by sensor 142 is also transmitted to the motor controller 172 through a time delay device 174 that is calibrated to delay the signal for a predetermined time (e.g. six seconds) so that the motor controller 172 does not reverse the direction of the drive motor 108 until the shifting unit 152 has had time to move to its new, indexed position. Once the predetermined time delay expires, the drive motor 108 is reversed to cause the carriage 122 to leave the shifting unit 152 and pass along the next adjacent spacing 104 between the next two filter elements 100, and the above-described control sequence is repeated until the carriage 122 is positioned for movement down the spacing 104 between the last two filter elements 100 at the left-hand end of FIG. 9.

Figure 15:
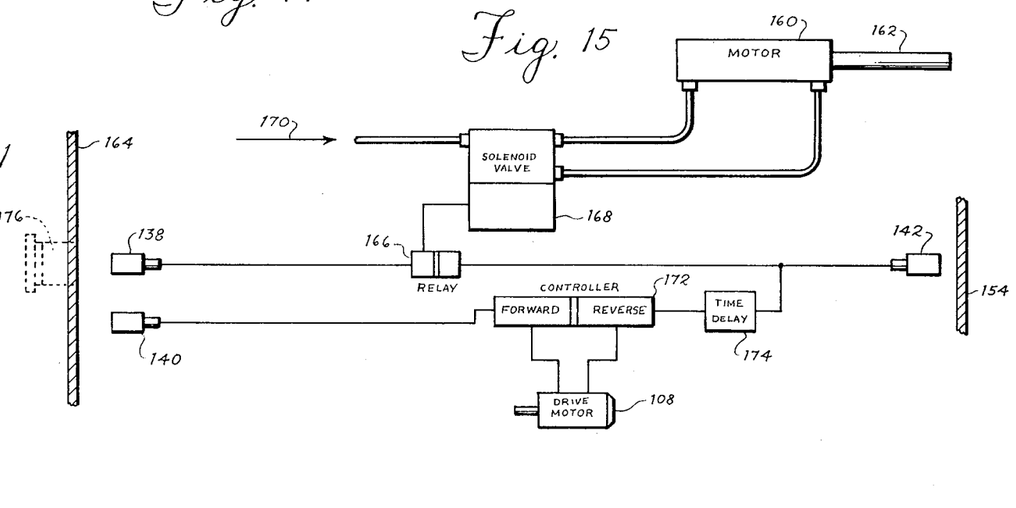
FIG. 15 is a wiring diagram illustrating the electrical circuit for controlling the movement of the belt in the embodiment of the invention shown in FIG. 9.

The portion of the rear filter bank wall 164 that is located adjacent the spacings 104 at the two outermost ends of the back of filter elements 100 is provided with a plastic insert 176 disposed at the point where the beam from the proximity sensor 138 strikes the wall 164, the plastic insert 176 being shown in dotted lines in FIG. 15. The plastic insert 176 will result in the sensor 138 not being energized as it approaches the rear wall 164 of the two outermost or end spacings 104, whereby when the carriage 122 approaches the rear wall in these spacings 104, no signal is generated by the sensor 138 and there is no movement of the shifting unit 152. Thus, when the carriage 122 reverses its direction of movement to move back toward the shifting unit 152, the shifting unit is still positioned to receive the carriage 122 therein, and as the carriage 122 approaches the end wall 154, the sensor 142 generates a signal which moves the shifting unit 152 one step to the right and then reverses the drive motor 108 (with a time delay), as all described above.

It will be understood from the above that the control system illustrated in FIG. 15 results in the carriage 152 being moved down and back one of the spacings 104, then shifted or indexed in one direction to the next adjacent spacings 104 until the carriage 152 has moved down and back the last or outermost spacing 104, whereupon it was moved in the opposite direction to the next adjacent spacing 104. Thus, the filtering belt 106 is automatically and continuously moved down and back each spacing 104 in sequence, and the facing filtering surfaces 102 on each side of each spacing 104 are simultaneously cleaned by the moving belt 106, whereby the entire bank of filter elements 100 is continuously cleaned of foreign matter collected thereon.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. Self-cleaning filtering apparatus comprising:
   (a) filter media supported to provide a surface for filtering fluid passing therethrough and for collecting foreign matter thereon;
   (b) means for cleaning said filter media comprising:
      (i) belt means having an extending length disposed along said surface of said filter media and disposed adjacent thereto, said belt means being mounted for movement in a direction along at least a portion of said filter media surface, said belt means having opening means extending therethrough and disposed adjacent said filter media surface;
      (ii) means for selectively moving said belt means in said direction of movement along said portion of said filter media; and
      (iii) means for imposing a vacuum at said opening means in said belt means to draw said foreign matter collected on said filter media through said opening means during movement of said belt along said portion of said filter media.

2. Self-cleaning filtering apparatus as defined in claim 1 and further characterized in that said belt means and said belt moving means are mounted on carriage means for transporting said belt means and said belt moving means along the surface of said filter media surface in a direction different from said direction of movement of said belt means caused by said belt moving means.

3. Self-cleaning filtering apparatus as defined in claim 2 and further characterized in that said filter media surface is generally flat, and in that said carriage means moves said belt means and said belt moving means along the surface of said filter media surface in a direction substantially perpendicular to the direction of movement of said belt means caused by said belt moving means.

4. Self-cleaning filtering apparatus as defined in claim 2 and further characterized in that at least two filter medias are disposed adjacent one another in spaced relation, and in that said carriage means transports said belt means and said belt moving means along a path of movement between said adjacent filter media, and in that said belt moving means moves said belt means simultaneously along said filtering surfaces of both filter medias with said belt opening adjacent thereto to clean simultaneously both said filter medias.

5. Self-cleaning filtering apparatus as defined in claim 4 and further characterized in that at least three filter medias are disposed in adjacent parallel relationship with a spacing between each two adjacent filter medias, and in that said carriage means is adapted to transport said belt means and said belt moving means selectively along a path of movement between any two adjacent filter medias.

6. Self-cleaning filtering apparatus comprising:
   (a) a rotary drum filter having a cylindrically shaped filter media through which air passes to cause foreign matter in the air to collect on one surface of said filter media;
   (b) means for cleaning said filter media including:
      (i) a generally enclosed plenum chamber extending along the axial length of said filter media in close proximity thereto, said plenum chamber having an axially extending slot in the wall portion thereof adjacent said filter media;
      (ii) an endless belt formed with openings therein at spaced locations along the length thereof, said endless belt being mounted on said plenum chamber with one reach thereof extending along the length of said plenum chamber immediately adjacent said slot, and with said openings in said reach of said belt being in communication with said slot;
      (iii) means engaging said endless belt to cause selective movement thereof along the length of said plenum chamber; and
      (iv) a vacuum source connected to the interior of said plenum chamber to create a vacuum therein and to thereby draw air through the openings in said endless belt which are in communication with said slot to thereby remove said foreign matter from said filter media.

7. Self-cleaning filtering apparatus as defined in claim 6 and characterized further in that said endless belt has nozzle elements mounted thereon at the location of at least some of said openings, said nozzle elements extending away from said endless belt and toward said filter media, and in that the extending length of at least some of said nozzle elements is different from the extending length of other of said nozzle elements.

8. Self-cleaning filtering apparatus as defined in claim 6 and characterized further in that said endless belt includes retaining means for removably mounting said nozzle elements on said endless belt at said openings therein, and in that imperforate plate means are provided for alternate mounting on said endless belt by said retaining means when said nozzle elements are removed therefrom, said imperforate plate means being formed to cover said openings in said endless belt.

9. Self-cleaning filtering apparatus comprising:
   (a) at least one generally flat filter media providing a surface for filtering fluid passing therethrough and for collecting foreign matter thereon;
   (b) means for cleaning said filter medias comprising:
      (i) belt means mounted for movement along said filter media surface with said belt means being closely adjacent thereto, said belt means having opening means extending therethrough;
      (ii) first drive means for moving said belt means in a first direction of movement along said filter media surface;

(iii) second drive means for moving said belt means in a second direction of movement along said filter media surface, said second direction of movement being different from said first direction of movement; and
(iv) means for imposing a vacuum at said opening means in said belt means to draw said foreign matter collected on said filter media through said openings during movement of said belt means along said filter media surface.

10. Self-cleaning filtering apparatus as defined in claim 9 and further characterized in that said second direction of movement of perpendicular to said first direction of movement.

11. Self-cleaning filtering apparatus according to claim 9 and further characterized in that said filter media is generally flat and is disposed in a generally upright position, and in that said first drive means moves said belt means in a generally vertial direction of movement and said second drive means moves said belt means in a generally horizontal direction of movement.

12. Self-cleaning filtering apparatus according to claim 9 and further characterized in that said apparatus includes at least two filter media arranged in spaced relation to one another with said filtering surfaces thereof facing one another, and in that said belt means is located between said filter media and closely adjacent both of said facing filtering surfaces of said filter media.

13. Self-cleaning filtering apparatus according to claim 9 and further characterized in that said belt means includes an endless belt formed of flexible material having a plurality of openings therein and extending around roller means mounted at spaced locations, in that said first drive means is arranged to rotate at least one of said roller means to move said belt means in said first direction of movement.

14. Self-cleaning filtering apparatus according to claim 13 and further characterized in that said second drive means includes carriage means supporting said belt means and said first drive means for movement along said filter media surface in said second direction of movement.

15. Self-cleaning filtering apparatus according to claim 9 and further characterized in that said apparatus includes at least three of said generally flat filter media disposed in spaced parallel relation to one another, and in that transverse indexing means is provided for selectively disposing said belt means and said first and second drive means for movement within the spacing between any two adjacent pair of said filter medias.

16. Self-cleaning filtering apparatus according to claim 15 and further characterized in that at least three filter medias are disposed upright, in that said first drive means moves said belt means in a direction of movement corresponding to the vertical extent of said upright filter medias, in that said second drive means moves said belt means in a direction of movement corresponding to the horizontal extent of said upright filter media, and in that said transverse indexing means is disposed at one of the vertical edges of said media.

17. Self-cleaning filtering apparatus according to claim 16 and further characterized in that said second drive means includes a pair of tracks associated with each pair of said filter media and extending therealong in a horizontal direction and includes carriage means mounted for movement along said tracks, said carriage means supporting said belt means and said first drive means for movement therewith, and in that said transverse indexing means includes a receiver means disposed adjacent one of the vertical edges of said filter media and movable to predetermined positions in alignment with any of said pairs of tracks, said receiver means being capable of receiving and supporting said carriage means therein, whereby said carriage means can be selectively positioned by said traverse indexing means for movement between any two of said filter media along said pair of tracks extending therealong.

18. Self cleaning filtering apparatus according to claim 17 and further characterized further in that said apparatus includes control means for automatically causing said second drive means to move said carriage means between two selected adjacent filter medias in a first forward direction from said one vertical edge thereof to the opposite vertical edge thereof, and then in a second reverse direction from said opposite vertical edge to said one vertical edge, and then causing said transverse indexing means to move automatically and selectively said carriage means for corresponding forward and reverse directions of movement between two other selected filter media.

19. Self-cleaning filtering apparatus comprising:
(a) filter media which is generally cylindrical in shape and supported to provide a surface for filtering fluid passing therethrough and for collecting foreign matter thereon;
(b) means for cleaning said filter media comprising:
(i) belt means mounted for movement in an axial direction along said surface of said filter media surface, said belt means having opening means extending therethrough and disposed adjacent said filter media surface;
(ii) means for selectively moving said belt means in said direction of movement along said filter media surface; and
(iii) means for imposing a vacuum at said opening means in said belt means to draw said foreign matter collected on said filter media through said opening means during movement of said belt along said portion of said filter media.

20. Self-cleaning filtering apparatus as defined in claim 19 and further characterized in that said belt means includes an endless belt formed of flexible material having a plurality of openings therein and extending around roller means mounted for rotation at spaced positions along the surface of said filter media, and in that said moving means includes drive means for rotating one of said roller means to move said belt means.

21. Self-cleaning filtering apparatus as defined in claim 3 and characterized further in that said endless belt includes nozzle elements mounted thereon in communication with at least some of said openings in said endless belt, said nozzle elements extending away from the surface of said endless belt in a direction toward said filter media.

22. Self-cleaning filtering apparatus as defined in claim 21 and characterized further in that the extending length of some of said nozzle elements is different from the extending length of others of said nozzle elements.

23. Self-cleaning filtering apparatus as defined in claim 20 and characterized further in that said endless belt includes retaining means located adjacent at least some of said openings, in that said nozzle elements are formed to be selectively engaged and supported by said retaining means and to be disengaged from said retaining means, and in that imperforate plate means are provided, said imperforate plate means being formed to be selectively engaged and supported by said retaining means to extend across and close to said openings.

24. Self-cleaning filtering apparatus as defined in claim 19 and characterized further in that said belt means includes a generally enclosed plenum chamber extending along said portions of said filter media surface and having a slot formed therein along the extending length of said plenum chamber and adjacent said filter media, and in that said belt means includes an endless belt member mounted for movement along the extending length of said plenum chamber and over said slot, with said opening means being formed in said belt member and being in communication with said slot during movement of said belt member along said plenum chamber, and in that said vacuum means is connected to the interior of said plenum chamber to impose a vacuum therein.

25. Self-cleaning filtering apparatus as defined in claim 24 and characterized further in that said plenum chamber comprises an extending length of rectangular tubing with one side wall thereof having said slot formed therein to extend along the length thereof, and in that said belt member includes a plurality of openings extending therethrough, said belt member being mounted with one reach thereof extending along said one side of said rectangular tubing and with the other reach extending along the opposite side of said rectangular tubing.

26. Self-cleaning filtering apparatus as defined in claim 25 and characterized further in that the extending ends of said rectangular tubing are closed by end wall portions, in that said belt means includes two rollers supported for rotation, respectively, at said ends of said rectangular tubing and spaced from said end walls thereof with said endless belt member extending around said rollers in surface contact therewith, whereby said openings in said endless belt member will impose a cleaning suction at said rollers as said openings move past said end walls of said rectangular tubing during said movement of said belt member.

27. A method of cleaning a filter media comprising the steps of:
(a) supporting a length of filter media to permit the passage therethrough of fluid having foreign matter entrained therein so that said foreign matter is disposed on a surface portion of said filter media;
(b) providing an endless belt having an extending length disposed along said surface portion of said filter media adjacent thereto, said belt having at least one opening formed therein;
(c) causing said endless belt to move in a direction across a portion of said one surface of said filter media in close proximity thereto; and
(d) imposing a vacuum at said opening in said endless belt during said movement thereof across said filter media to cause said foreign matter on said one surface of said filter media to be drawn through said openings and removed from said filter media.

28. A method of cleaning a filter media as defined in claim 27, and further characterized by the steps of providing a supporting surface extending along said filter media portion in close proximity therefrom to support said endless belt during said movement thereof across said filter media portion, forming said supporting surface with a slot extending along the length thereof and in continuous communication with said opening in said endless belt during said movement thereof across said filter media portion, and causing said vacuum to be imposed at said opening of said endless belt through said slot.

29. A method of cleaning a filter media as defined in claim 27 and characterized further by the step of moving said endless belt across said filter media portion in only one direction of movement, and spacing a plurality of openings in said endless belt along the length thereof so that at least one opening in said endless belt is always adjacent said filter media portion to remove foreign matter therefrom during said movement of said endless belt.

30. A method of cleaning a filter media as defined in claim 29 and further characterized by the step of forming at least two openings in said endless belt in closely spaced relation to one another along the length of said endless belt, locating the first of said openings taken in the direction of movement of said endless belt at a greater distance from said filter media portion than the second said opening to cause foreign matter on said filter media to be removed therefrom in two stages through said two openings.

31. A method of cleaning filter media comprising the steps of:
(a) supporting a filter media to present a generally flat surface for filtering fluid passing therethrough and collecting foreign matter thereon;
(b) providing an endless belt having a lengthwise extending reach and having at least one opening formed therein;
(c) causing said endless belt to move in a first direction of movement corresponding to said lengthwise extent thereof along said filter media filtering surface in close proximity thereto;
(d) simultaneously causing said endless belt to be moved in a second direction of movement across said filter media, said second direction of movement being different from said first direction of movement; and
(e) imposing a vacuum at said opening in said endless belt during said movements thereof to cause said foreign matter on said filter element to be drawn through said opening and removed from said filter media.

32. A method of cleaning filter media as defined in claim 31 and further characterized by the steps of providing two filter medias in spaced relation to one another with said filtering surfaces thereof in facing relation, arranging said endless belt between said spaced filter medias with two reaches of said endless belt being disposed, respectively, in close proximity to the facing filtering surface portion of said two filter media, whereby said movements of said endless belt causes both of said filter medias to be cleaned.

33. A method of cleaning filter media comprising the steps of:
(a) providing at least three flat filter medias, each having a surface for filtering fluid passing therethrough and collecting foreign matter thereon;
(b) arranging said filter medias in spaced parallel relation, with each filter media having a filtering surface facing the filtering surface of an adjacent filter media;
(c) arranging a belt into an endless loop having at least two lengthwise extending reaches and forming at least one opening in said belt;
(d) causing movement of said belt in a first direction of movement corresponding to said lengthwise extent thereof, with said belt being disposed between a first selected pair of said filter medias and with said two belt reaches located respectively in close proximity to said facing filtering surface of said selected pair of filter medias;

(e) simultaneously moving said belt in a second direction of movement perpendicular to said first direction of movement;

(f) imposing a vacuum at said opening during said movement thereof to cause said foreign matter on said filter media surfaces to be drawn through said opening and removed from said filter media; and (g) selectively positioning said endless belt for said first and second movements between a second selected pair of said filter medias.

34. Filter cleaning apparatus comprising
(a) filter media supported to provide a surface for filtering fluid passing therethrough and for collecting foreign matter therein;
(b) means for cleaning said filter media comprising:
  (i) an endless belt extending about two spaced rollers to present two reaches of said belt, at least one of said reaches extending along a portion of said filter media surface closely adjacent thereto, said belt having opening means extending therethrough and disposed adjacent said filter media surface;
  (ii) means for continuously moving said endless belt in one direction only about said rollers to cause said opening means to move across said filter media surface; and
  (iii) means for imposing a vacuum at said opening means in said belt to draw said foreign matter collected on said filter media through said opening means during movement of said belt along said filter media.

35. Filter cleaning apparatus as defined in claim 34 and further characterized in that said opening means includes at least two openings equally spaced from one another along the length of said endless belt whereby at least one of said openings is presented at either one of said belt reaches during said continuous movement of said belt.

* * * * *

UNITED STATES PATENT OFFICE
CERTIFICATE OF CORRECTION

Patent No. 4,725,292     Dated February 16, 1988

Inventor(s) Roger D. Williams

It is certified that error appears in the above-identified patent and that said Letters Patent is hereby corrected as shown below:

Abstract, line 20   delete "is" and insert therefor — it—.
Abstract, line 22   delete "sequences" and insert therefor — sequence —.
Column 1, line 44   delete "abovedescribed" and insert — above-described —.
Column 8, line 27   delete "beltsupport" and insert — belt-support —.
Column 9, line 58   delete "," and insert — . —.
Column 13, line 13   delete "of" (second occurrence) and insert — is —.
Column 14, line 10   delete "self cleaning" and insert — self-cleaning —
Column 14, line 51   delete "3" and insert — 20 — .
Column 15, line 46   delete "disposed" and insert — deposited —.

Signed and Sealed this

Twenty-first Day of November, 1989

Attest:

JEFFREY M. SAMUELS

*Attesting Officer*     *Acting Commissioner of Patents and Trademarks*